June 30, 1931.  H. M. EDMUNDS  1,811,921
CHANGE SPEED GEARING
Filed June 9, 1930

Inventor,
Howard Maurice Edmunds
By *Samuel W. Balch*
Attorney.

Patented June 30, 1931

1,811,921

UNITED STATES PATENT OFFICE

HOWARD MAURICE EDMUNDS, OF NEW YORK, N. Y., ASSIGNOR TO CROCKER-WHEELER ELECTRIC MANUFACTURING COMPANY, OF AMPERE, NEW JERSEY, A CORPORATION OF NEW JERSEY

CHANGE SPEED GEARING

Application filed June 9, 1930. Serial No. 459,931.

This invention relates particularly to adhesion gearing for effecting speed changing in which several cooperating cylindrical members have their cylindrical surfaces in friction or adhesion engagement, and it is not practical or desirable to restrain all of the members through their bearings from excessive displacement relative to one another in the direction of their axes.

It has been found that due to minute inaccuracies of parallelism of the members, or due to failure to grind the surfaces truly cylindrical instead of slightly coned, or to identical diameters, there is a tendency of one or the other to be displaced in the direction of its axis. Such displacement produces a disturbing effect on the operation of the mechanism, and it is the object of this invention to restrain the members against such axial displacement.

Further objects are to retain a construction which is convenient for manufacture and assembling, and which will allow of a slight axial movement between members in adhesion contact whereby any particles of grit are prevented from tracking and scoring the surfaces, and instead a polishing action is insured.

Figure 1:
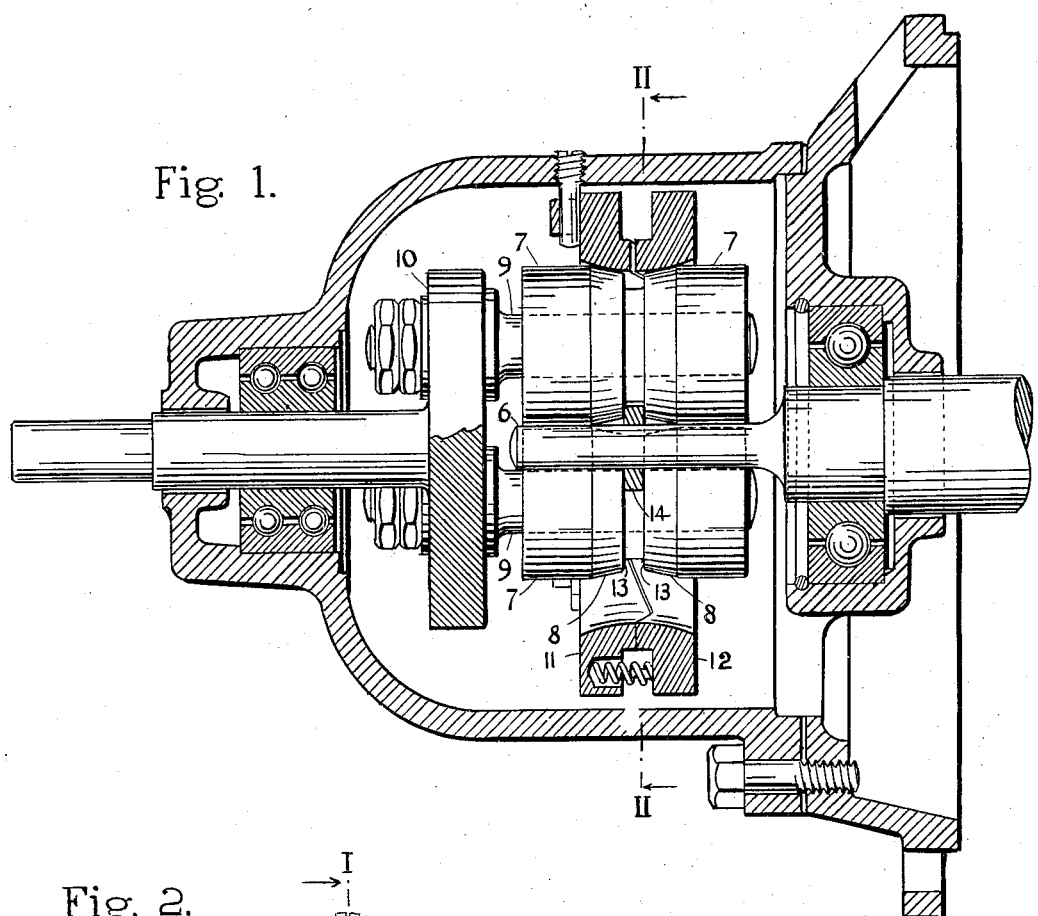
Figure 2:
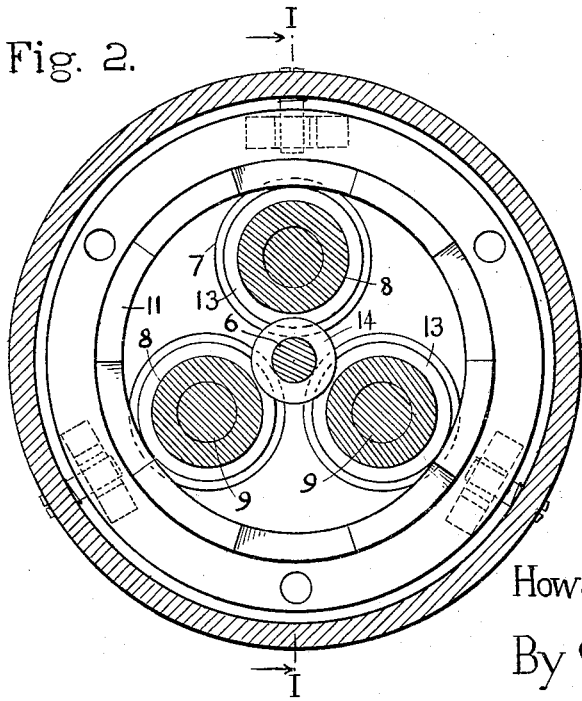

In the accompanying sheet of drawings which form a part of this description,

Figure 1 is a section through the casing and operating parts on the line I—I of Fig. 2, showing a speed changing system with satellite rollers in which this invention is embodied, and Fig. 2 is a section through the same on the line II—II of Fig. 1.

This invention is embodied in a speed changing system of the type set forth in a joint application by this applicant and Edward Hileman Waring, Serial No. 358,448, filed April 27, 1928.

There is a central cylindrical roller 6 and satellite rollers, each with cylindrical parts 7, 7, and with parts 8, 8 having beveled surfaces arranged in opposed pairs, that is to say, coned in opposite directions. The satellite rollers are carried on axles 9, 9 held in a rotatable plate 10. The satellite rollers are co-operating member with respect to the intermediate central roller. Surrounding the satellite rollers is an outer race in two parts, one of which 11 is in engagement with one of the beveled surfaces of each of the satellite rollers and is restrained from rotating, and the other of which 12 is in engagement with the other beveled surface of each of the satellite rollers. Because of this race being in two parts the parts have a tendency to depart a little from their concentric relation with respect to each other, and they, therefore, by their engagement with the opposed coned surfaces of each of the satellite rollers, do not properly restrain these rollers from relative displacement in the direction of their axes to an undesirable extent. To prevent this, the satellite rollers have grooves turned in them, preferably between the opposed coned surfaces, and these, thereby, provide the rollers with shoulders 13, 13. A ring 14 enters the grooves and by engagement with the shoulders of the satellite rollers restrains them from relative displacement.

The ring may be free on the central roller, which is an intermediate member to the satellite rollers, to the extent of a few thousandths of an inch, and then will not tilt too much to function properly. It does not act to restrain the central roller against some relative endwise displacement with respect to the satellite rollers so that any particle of grit between the engaging surfaces will not track and score the surfaces.

Either the fast-speed member or the slow-speed member may be the driving member, the other being the driven member, and the speed changing system may therefore be used either as a speed reducer or as a speed increaser.

I claim,—

1. A speed changing system of adhesion gearing comprising an intermediate cylindrical member, cooperating cylindrical members with shoulders, and a ring freely carried by the intermediate member and engaging the shoulders of the cooperating members, whereby their relative displacement in the direction of their axes is prevented.

2. A speed changing system of adhesion gearing comprising an intermediate cylindrical member, cooperating cylindrical members with shoulders, and a ring freely carried by the intermediate member and held in the plane of the system thereby and engaging the shoulders of the cooperating members, whereby their relative displacement in the direction of their axes is prevented and their concurrent axial displacement is permitted.

3. A speed changing system of adhesion gearing comprising an intermediate cylindrical member, cooperating cylindrical members with surrounding grooves, and a ring freely carried by the intermediate member and held in the plane of the system thereby and engaging the grooves of the cooperating members, whereby their relative displacement in the direction of their axes is prevented.

4. A speed changing system of adhesion gearing comprising a central cylindrical roller, satellite rollers in frictional engagement with the central roller, the satellite rollers having beveled surfaces arranged in opposed pairs and also having circumferential grooves, an outer race in two parts one of which is in engagement with one of the beveled surfaces and the other of which is in engagement with the other beveled surface of each of the satellite rollers, and a ring freely carried by the central roller and held in the plane of the system thereby and engaging the grooves of the satellite rollers, whereby their relative displacement in the direction of their axes is prevented.

HOWARD MAURICE EDMUNDS.